(12) United States Patent
Zha

(10) Patent No.: US 11,635,842 B2
(45) Date of Patent: Apr. 25, 2023

(54) TOUCH PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Bao Zha, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 332 days.

(21) Appl. No.: 17/252,490

(22) PCT Filed: Nov. 17, 2020

(86) PCT No.: PCT/CN2020/129449
§ 371 (c)(1),
(2) Date: Dec. 15, 2020

(87) PCT Pub. No.: WO2022/073281
PCT Pub. Date: Apr. 14, 2022

(65) Prior Publication Data
US 2022/0300136 A1    Sep. 22, 2022

(30) Foreign Application Priority Data
Oct. 9, 2020    (CN) .......................... 202011071490.6

(51) Int. Cl.
*G06F 3/041*    (2006.01)
*G06F 3/042*    (2006.01)

(52) U.S. Cl.
CPC .......... *G06F 3/04164* (2019.05); *G06F 3/042* (2013.01); *G06F 3/0412* (2013.01)

(58) Field of Classification Search
CPC ................... G06F 3/0412; G06F 3/042; G06F 3/044–0448; G06F 3/041–047; G06F 2203/041–04114; H01L 27/323
See application file for complete search history.

(56) References Cited

U.S. PATENT DOCUMENTS

| | | | |
|---|---|---|---|
| 10,607,057 B2 | 3/2020 | Kwon et al. | |
| 2010/0026636 A1 | 2/2010 | Jang et al. | |
| 2018/0204040 A1 | 7/2018 | Kwon et al. | |

FOREIGN PATENT DOCUMENTS

| | | |
|---|---|---|
| CN | 101644839 A | 2/2010 |
| CN | 103092407 A | 5/2013 |
| CN | 103972241 A | 8/2014 |
| CN | 110286796 A | 9/2019 |
| KR | 20090116223 A | 11/2009 |

*Primary Examiner* — Sanjiv D. Patel
(74) *Attorney, Agent, or Firm* — The Roy Gross Law Firm, LLC; Roy Gross

(57) ABSTRACT

A touch panel provided by the present invention includes light sensitive circuits and a touch circuit. The light sensitive circuits include a readout line disposed along a second direction. The touch circuit includes signal emitting lines disposed along a first direction and signal receiving lines disposed along a second direction. Wherein, the signal emitting line, a scanning line, and a gate electrode are disposed on a same layer, and the signal receiving line, a readout line, and a source/drain electrode layer are disposed on a same layer. No additional film layer is added, integrating the light sensitive circuits and the touch circuit in one touch panel.

20 Claims, 3 Drawing Sheets

TOUCH PANEL AND DISPLAY DEVICE

CROSS REFERENCE TO RELATED APPLICATIONS

This application is a National Phase of PCT Patent Application No. PCT/CN2020/129449 having International filing date of Nov. 17, 2020, which claims the benefit of priority of Chinese Application No. 202011071490.6 filed on Oct. 9, 2020. The contents of the above applications are all incorporated by reference as if fully set forth herein in their entirety.

BACKGROUND OF INVENTION

Field of Invention

The present disclosure relates to the field of touch display technology, and particularly to a touch panel.

Description of Prior Art

In current touch panels, independent operating of light control sensors and touch sensors, or using different integrated circuits (ICs) to control the two sensors respectively, is commonly used. It is difficult to integrate a light control sensor and a touch sensor into one panel in a situation in which no film layer is added.

Therefore, in the current touch panels, the technical problem that it is difficult to integrate a light sensing circuit and a touch circuit into one panel is present.

SUMMARY OF INVENTION

Embodiments of the present disclosure provides a touch panel and display device, which can remedy the technical problem that it is difficult to integrate a light sensitive circuit and a touch circuit into one panel under a precondition not adding additional film layers.

An embodiment of the present disclosure provides a touch panel, including a plurality of light sensitive areas arranged in an array manner. The touch panel includes:

a plurality of scanning lines disposed along a first direction;

a plurality of data lines disposed along a second direction;

a plurality of light sensitive circuits disposed in the light sensitive areas, wherein the light sensitive circuit comprises a light sensitive transistor, the light sensitive transistor comprises a substrate, a gate electrode, a gate insulation layer, an active layer, and a source/drain electrode layer, and the light sensitive transistor is configured to convert an optical signal to an electrical signal; and a touch circuit comprising a plurality of signal emitting electrodes disposed along the first direction, and a plurality of signal receiving electrodes disposed along the second direction;

wherein the light sensitive circuit comprises a readout line disposed along the second direction, the signal emitting line, the scanning lines, and the gate electrode are disposed on a same layer, and the signal receiving line, the readout line, and the source/drain electrode layer are disposed on a same layer.

In the touch panel provided by an embodiment of the present disclosure, the light sensitive circuit further includes a switch transistor. A gate electrode of the light sensitive transistor is connected to a low-electric-potential power-supply electrode. A first electrode of the light sensitive transistor is connected to a high-electric-potential power-supply electrode. A second electrode of the light sensitive transistor is connected to a first electrode of the switch transistor. A gate electrode of the switch transistor is connected to the scanning line. A second electrode of the switch transistor is connected to the readout line.

In the touch panel provided by an embodiment of the present disclosure, the light sensitive circuit includes a storage capacitor. The storage capacitor includes a first terminal and a second terminal. The first terminal is connected to the second electrode of the light sensitive transistor and the first electrode of the switch transistor. The second terminal is connected to the low-electric-potential power-supply electrode.

In the touch panel provided by an embodiment of the present disclosure, the light sensitive circuit further includes a first position detecting circuit, and the first position detecting circuit is connected to the readout line.

In the touch panel provided by an embodiment of the present disclosure, the light sensitive circuit further includes a second position detecting circuit, and the second position detecting circuit is connected to the signal receiving line.

In the touch panel provided by an embodiment of the present disclosure, when the touch panel is stimulated by a finger's touch, the storage capacitor between the signal emitting line and the signal receiving line changes, and charges of the storage capacitor have been substantially changed. The change in the storage capacitor is transmitted by a signal. When the signal passes through the second position detecting circuit, a touch position can be detected.

In the touch panel provided by an embodiment of the present disclosure, a first overlapping area is formed by projections of the readout line and the signal emitting line on the substrate, and a second overlapping area is formed by projections of the scanning line and the signal receiving line on the substrate.

In the touch panel provided by an embodiment of the present disclosure, a number of the scanning lines and a number of the signal emitting lines are same.

In the touch panel provided by an embodiment of the present disclosure, the scanning lines and the signal emitting lines are arranged at intervals.

In the touch panel provided by an embodiment of the present disclosure, a number of the scanning lines and a number of the signal emitting lines are different.

In the touch panel provided by an embodiment of the present disclosure, a set of the scanning lines and a set of the signal emitting lines are arranged at intervals.

In the touch panel provided by an embodiment of the present disclosure, the set of the scanning lines includes at least two of the scanning lines, and the set of the signal emitting lines includes at least two of the signal emitting lines.

In the touch panel provided by an embodiment of the present disclosure, a number of lines of the set of the scanning lines is different from a number of lines of the set of the signal emitting lines.

In the touch panel provided by an embodiment of the present disclosure, a number of lines of the set of the scanning lines is same as a number of lines of the set of the signal emitting lines.

In the touch panel provided by an embodiment of the present disclosure, the signal emitting line transmits a first signal in a first time period, the scanning line transmits a second signal in a third time period, a second time period is between the first time period and the third time period, and a fourth time period is between the third time period and a next first time period.

In the touch panel provided by an embodiment of the present disclosure, the signal emitting lines and the scanning lines are configured to receive a periodic voltage.

In the touch panel provided by an embodiment of the present disclosure, the second time period needs to be greater than or equal to a data collecting time of the signal receiving line crossed to the signal emitting line.

In the touch panel provided by an embodiment of the present disclosure, the second time period is greater than the first time period.

In the touch panel provided by an embodiment of the present disclosure, the fourth time period is greater than the third time period.

An embodiment of the present disclosure provides a display device, including the touch panel as claimed in claims 1 to 19.

The touch panel provided by the embodiments of the present disclosure includes the plurality of light sensitive areas arranged in the array manner. The touch panel includes the plurality of scanning lines, the plurality of data lines, the light sensitive circuits, the touch circuit. The scanning lines are disposed along the first direction, and the data lines are disposed along the second direction. The touch circuit includes the plurality of signal emitting electrodes disposed along the first direction, and the plurality of signal receiving electrodes disposed along the second direction. Wherein, the light sensitive circuit includes the readout line disposed along the second direction, the signal emitting line, the scanning lines, and the gate electrode are disposed on the same layer, and the signal receiving line, the readout line, and the source/drain electrode layer are disposed on the same layer. By disposing the signal emitting lines, the scanning line, and the gate electrode on the same layer, and by disposing the signal receiving line, the data line, and the readout line on the same layer, the touch circuit and the light sensitive circuit can be integrated in a same touch panel on the precondition of not adding additional film layers.

DESCRIPTION OF DRAWINGS

The technical solutions and other advantageous effects of the present invention will be apparent with reference to the following accompanying drawings and detailed description of embodiments of the present disclosure.

DETAILED DESCRIPTION OF EMBODIMENTS

The technical solutions in the embodiments of the present disclosure are clearly and completely described in the following with reference to the accompanying drawings in the embodiments of the present disclosure. Obviously, the described embodiments are only part of the embodiments of the present disclosure, but are not all embodiments of the present disclosure. All other embodiments obtained by those skilled in the art based on the embodiments of the present disclosure without creative efforts are within the scope of the present disclosure.

In the description of the present disclosure, it is to be understood that the orientation or positional relationship indicated by the terms "center", "longitudinal", "transverse", "length", "width", "thickness", "upper", "lower", "front", "rear", "left", "right", "vertical", "horizontal", "top", "bottom", "inside", "outside", "clockwise", "counter-clockwise" etc. is based on the orientation or positional relationship shown in the accompanying figures, which is merely for the convenience for describing of the present disclosure and for the simplification of the description, and is not intended to indicate or imply that the indicated devices or elements have a specific orientation or is constructed and operated in a specific orientation. Therefore, it should not be understood as a limitation on the present disclosure. Moreover, the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly. In the description of the present disclosure, the meaning of "a plurality" is two or more unless clearly and specifically defined otherwise.

Figure 1:
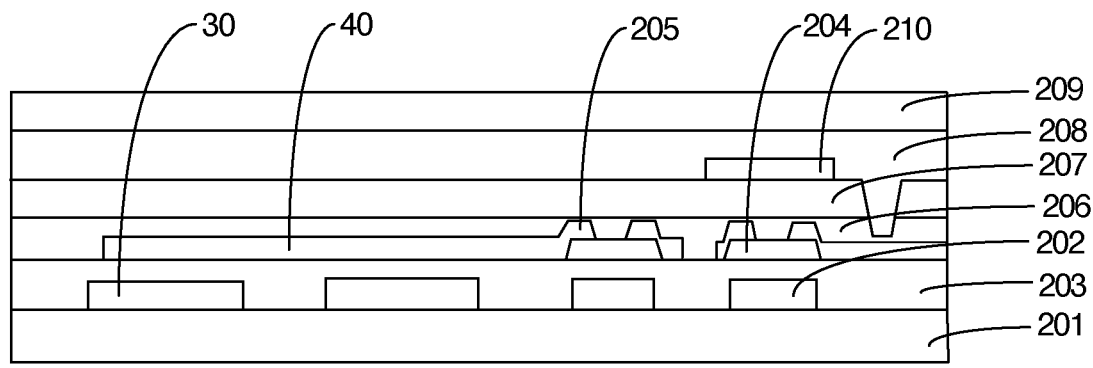
FIG. 1 is a sectional schematic diagram of a touch panel provided by an embodiment of the present disclosure.
Figure 3:
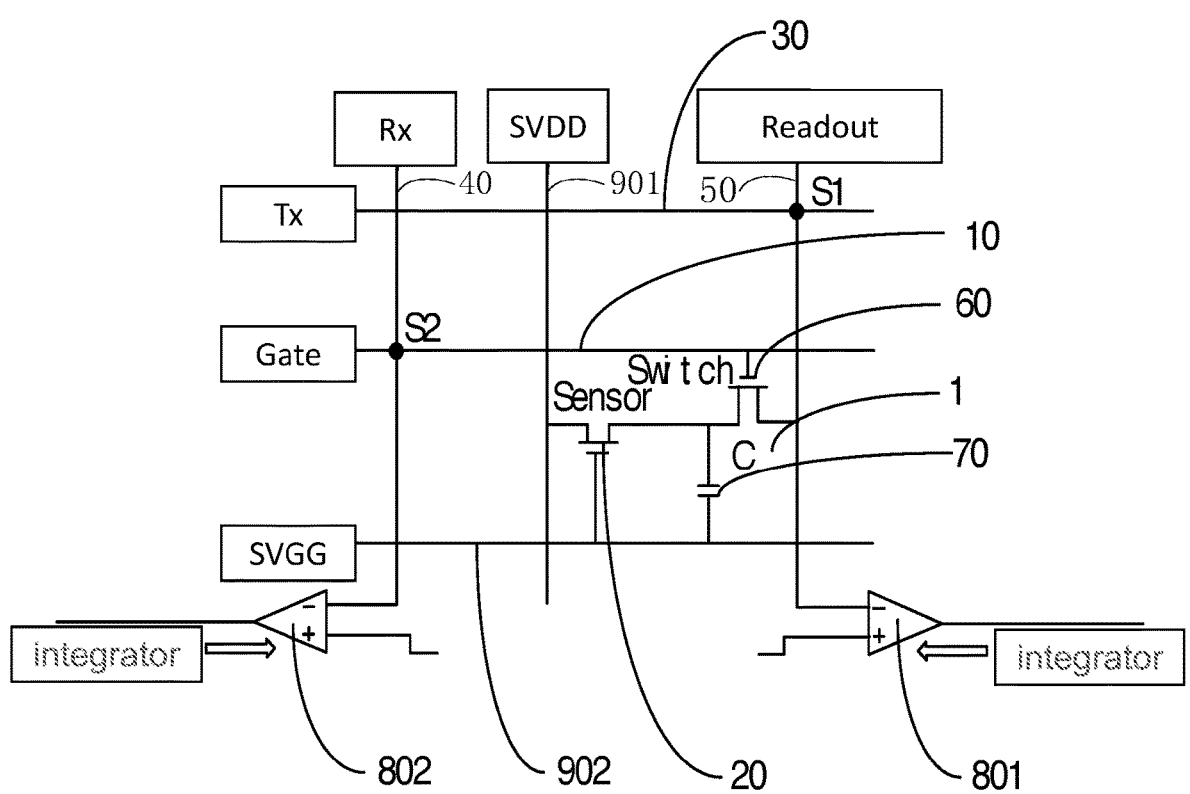
FIG. 3 is a schematic diagram of a simplified circuit of integration of a light control sensor and a touch sensor provided by an embodiment of the present disclosure.

As illustrated in FIG. 1 and FIG. 3, a touch panel provided by embodiments of the present disclosure includes a plurality of light sensitive areas 1 arranged in an array manner. The touch panel includes a plurality of scanning lines 10, a plurality of data lines disposed along a second direction, light sensitive circuits, and a touch circuit. The light sensitive circuits are disposed in the light sensitive areas. The light sensitive circuit includes a light sensitive transistor. The light sensitive transistor includes a substrate 201, a gate electrode 202, a gate insulation layer 203, an active layer 204, a source/drain electrode layer 205. The light sensitive transistor 20 is configured to convert an optical signal to an electrical signal. The touch circuit includes the plurality of signal emitting electrodes disposed along the first direction, and the plurality of signal receiving electrodes disposed along the second direction. Wherein, the light sensitive circuit includes a readout line 50 disposed along the second direction. The signal emitting line 30, the scanning lines 10, and the gate electrode 202 are disposed on a same layer. The signal receiving line 40, the readout line 50, and the source/drain electrode layer 205 are disposed on a same layer.

In this embodiment, the touch panel includes the plurality of light sensitive areas arranged in the array manner. The touch panel includes a plurality of scanning lines 10, a plurality of data lines disposed along a second direction, light sensitive circuits, and a touch circuit. The light sensitive circuits are disposed in the light sensitive areas. The light sensitive transistor includes a substrate 201, a gate electrode 202, a gate insulation layer 203, an active layer 204, and a source/drain electrode layer 205. The light sensitive transistor 20 is configured to convert an optical signal to an electrical signal. The touch circuit includes the plurality of signal emitting electrodes disposed along the first direction and the plurality of signal receiving electrodes disposed along the second direction. Wherein, the light sensitive circuit includes a readout line 50 disposed along the second direction. The signal emitting line 30, the scanning lines 10, and the gate electrode 202 are disposed on a same layer. The signal receiving line 40, the readout line 50, and the source/drain electrode layer 205 are disposed on a same layer. By disposing the signal emitting lines 30, the scanning line 10, and the gate electrode 202 on the same layer, and by disposing the signal receiving line 40, the data line, and the readout line 50 on the same layer, the touch circuit and the light sensitive circuit can be integrated in a same touch panel on the precondition of not adding additional film layers.

Wherein, the light sensitive transistor 20 further includes a passivation layer 206, a planarization layer 207, a first optical clear adhesive layer 208, a cover plate 209, and a black matrix layer 210 disposed on the source/drain electrode layer 205.

In an embodiment, the light sensitive circuit further includes a switch transistor 60. A gate electrode of the light sensitive transistor 20 is connected to a low-electric-potential power-supply electrode. A first electrode of the light sensitive transistor 20 is connected to a high-electric-potential power-supply electrode. A second electrode of the light sensitive transistor 20 is connected to a first electrode of the switch transistor 60. A gate electrode 202 of the switch transistor 60 is connected to the scanning line 10. A second electrode of the switch transistor 60 is connected to the readout line 50.

In an embodiment, the light sensitive circuit further includes a storage capacitor 70. The storage capacitor 70 includes a first terminal and a second terminal. The first terminal is connected to the second electrode of the light sensitive transistor 20 and the first electrode of the switch transistor 60. The second terminal is connected to the low-electric-potential power-supply electrode.

In an embodiment, the light sensitive circuit further includes a first position detecting circuit 801, and the first position detecting circuit 801 is connected to the readout line 50.

In an embodiment, a first overlapping area is formed by projections of the readout line 50 and the signal emitting line 30 on the substrate 201, and a second overlapping area is formed by projections of the scanning line 10 and the signal receiving line on the substrate 201.

In an embodiment, a number of the scanning lines 10 and a number of the signal emitting lines 30 are same.

In an embodiment, the scanning lines 10 and the signal emitting lines 30 are arranged at intervals.

In an embodiment, a number of the scanning lines 10 and a number of the signal emitting lines 30 are different.

In an embodiment, a set of the scanning lines 10 and a set of the signal emitting lines 30 are arranged at intervals.

Wherein, the set of the scanning lines 10 can include two scanning lines 10 arranged adjacently, and the set of the signal emitting lines 30 can include two signal emitting lines 30 arranged adjacently.

Wherein, the set of the scanning lines 10 can include three scanning lines 10 arranged adjacently, and the set of the signal emitting lines 30 can include three signal emitting lines 30 arranged adjacently.

In an embodiment, one set of the scanning lines 10 and one set of the signal emitting lines 30 are arranged at intervals. Wherein, a number of lines of the set of the scanning lines 10 is different from a number of lines of the set of the signal emitting lines 30.

In an embodiment, as illustrated in FIG. 3, the signal emitting line 30 transmits a first signal in a first time period; the scanning line 10 transmits a second signal in a third time period; a second time period is between the first time period and the third time period; and a fourth time period is between the third time period and a next first time period.

Wherein, the second time period needs to be greater than or equal to a data collecting time of the signal receiving line 30 crossed to the signal emitting line 40.

Wherein, the fourth time period needs to be greater than the time of the data collecting time of the light sensitive circuit.

In an embodiment, the second time period is greater than the first time period.

In an embodiment, the fourth time period is greater than the third time period.

Figure 2:
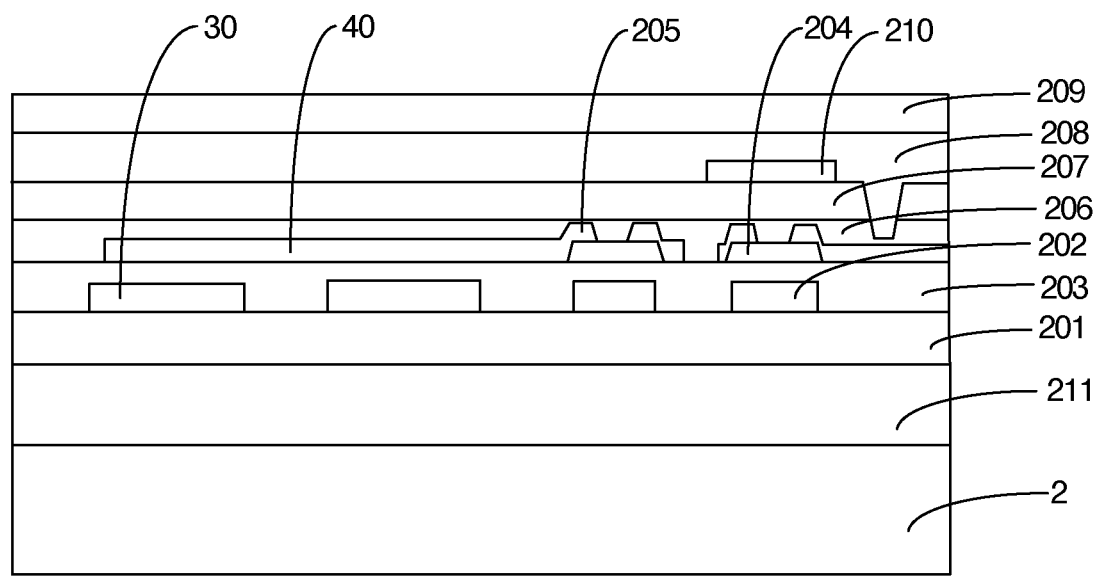
FIG. 2 is a sectional schematic diagram of a display device provided by an embodiment of the present disclosure.

As illustrated in FIG. 2, a display device provided by an embodiment of the present disclosure includes a touch panel and a display panel 2. The touch panel and the display panel 2 are bonded together by a second optical clear adhesive layer 211.

Wherein, the display panel 2 can be any one of a liquid crystal display panel, an organic light emitting diode (OLED) display panel, a quantum dot light emitting diode (QLED) display panel, a mini-LED display panel, or a micro-LED display panel.

In an embodiment, in the display device, the light sensitive circuit further includes a switch transistor 60. A gate electrode of the light sensitive transistor 20 is connected to a low-electric-potential power-supply electrode. A first electrode of the light sensitive transistor 20 is connected to a high-electric-potential power-supply electrode. A second electrode of the light sensitive transistor 20 is connected to a first electrode of the switch transistor 60. A gate electrode 202 of the switch transistor 60 is connected to the scanning line 10. A second electrode of the switch transistor 60 is connected to the readout line 50.

In an embodiment, in the display device, the light sensitive circuit further includes a storage capacitor 70, the storage capacitor 70 includes a first terminal and a second terminal. The first terminal is connected to the second electrode of the light sensitive transistor 20 and the first electrode of the switch transistor 60. The second terminal is connected to the low-electric-potential power-supply electrode.

In an embodiment, in the display device, the light sensitive circuit further includes a first position detecting circuit 801, and the first position detecting circuit 801 is connected to the readout line 50.

In an embodiment, in the display device, a first overlapping area is formed by projections of the readout line 50 and the signal emitting line 30 on the substrate 201, and a second overlapping area is formed by projections of the scanning line 10 and the signal receiving line on the substrate 201.

In an embodiment, in the display device, a number of the scanning lines 10 and a number of the signal emitting lines 30 are same.

In an embodiment, in the display device, the scanning lines 10 and the signal emitting lines 30 are arranged at intervals.

In an embodiment, in the display device, a number of the scanning lines 10 and a number of the signal emitting lines 30 are different.

In an embodiment, in the display device, a set of the scanning lines 10 and a set of the signal emitting lines 30 are arranged at intervals.

Wherein, the set of the scanning lines 10 can include two scanning lines 10 arranged adjacently, and the set of the signal emitting lines 30 can include two signal emitting lines 30 arranged adjacently.

Wherein, the set of the scanning lines 10 can include three scanning lines 10 arranged adjacently, and the set of the signal emitting lines 30 can include three signal emitting lines 30 arranged adjacently.

In an embodiment, in the display device, one set of the scanning lines 10 and one set of the signal emitting lines 30 are arranged at intervals. Wherein, a number of lines of the set of the scanning lines 10 is different from a number of lines of the set of the signal emitting lines 30.

In an embodiment, in the display device, as illustrated in FIG. 3, the signal emitting line 30 transmits a first signal in a first time period; the scanning line 10 transmits a second signal in a third time period; a second time period is between the first time period and the third time period; and a fourth time period is between the third time period and a next first time period.

Wherein, the second time period needs to be greater than or equal to a data collecting time of the signal receiving line 30 crossed to the signal emitting line 40.

Wherein, the fourth time period needs to be greater than the time of the data collecting time of the light sensitive circuit.

In an embodiment, in the display device, the second time period is greater than the first time period.

In an embodiment, in the display device, the fourth time period is greater than the third time period.

In an embodiment, the light sensitive circuit mainly includes two thin film transistors and one storage capacitor 70. The two thin film transistors include one light sensitive transistor 20 and one switch transistor 60.

Wherein, hydrogenated amorphous silicon is used as a material of a semiconductor and a light sensitive semiconductor.

Wherein, a working principle of the light sensitive circuit is that when the light sensitive circuit is stimulated by illumination, amorphous silicon of the light sensitive transistor 20 can generate carriers, the carriers are collected by the storage capacitor 70, and a signal passes through the first position detecting circuit 801 by controlling the switch transistor.

In an embodiment, the touch circuit includes a plurality of electrodes in the first direction and a plurality of embodiments in the second direction.

Wherein, the electrodes in the first direction are arranged to form the signal emitting lines 30.

Wherein the electrodes in the second direction are arranged to form the signal receiving lines 40.

Wherein, a working principle of a touch sensor is that when the touch sensor is stimulated by a finger's touch, a projected capacitor between the signal emitting line 30 and the signal receiving line 40 changes, and charges of the projected capacitor have been substantially changed. When a signal passes through the second position detecting circuit 802 by detecting the change in the capacitor, a touch position can be detected.

As illustrated in FIG. 3, which is a simplified circuit diagram of integration of the light control sensor and the touch circuit. Wherein, "readout" is the readout line disposed in the second direction same as the signal receiving line 40. When the touch panel receives a touch or optical control signal, generated charge change can be transmitted by the readout line. Through an enlarging process of the position detecting circuit, a coordinate position of a stimulated point of the signal (optical control/touch control) can be positioned accurately.

In an embodiment, the signal emitting line 30, the gate electrode 202, the low-electric-potential power-supply electrode 902, and the scanning line 10 of the light sensitive circuit are disposed on a same layer, which is a gate electrode layer; the signal receiving line 40, the high-electric-potential power-supply electrode 901 of the light sensitive circuit, the readout line, and the data line are disposed on a same layer, which is a source/drain electrode layer 205.

Wherein, functions of the signal receiving line 40 and the readout line are sensing signals, which electrical signal states are not constant.

Wherein, the low-electric-potential power-supply electrode 902 and the high-electric-potential power-supply electrode are electrodes of the light sensitive transistor 20, which have constant voltages.

Wherein, the electrodes of the signal emitting lines 30 and the scanning lines 10 have periodic voltages.

In an embodiment, as illustrated in FIG. 3, a first crossed overlapping coupling area S1 is formed by projections of the readout line and the signal emitting line 30.

Figure 4:
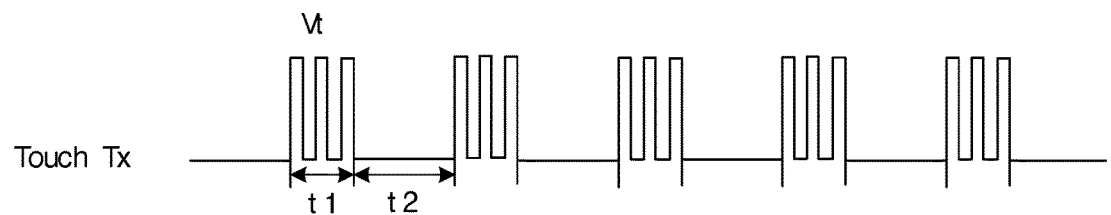
FIG. 4 is a time sequence diagram of an electric potential of signal emitting lines provided by an embodiment of the present disclosure.

Wherein, as illustrated in FIG. 4, a voltage of the first crossed overlapping coupling area S1 changes between 0 and Vt. Vt is a first voltage and ranges from 5V to 40 V, and a frequency thereof is ft=1/(t1+t2).

In an embodiment, as illustrated in FIG. 3, a second crossed overlapping coupling area S2 is formed by projections of the signal receiving line 40 and the scanning line 10.

Figure 5:
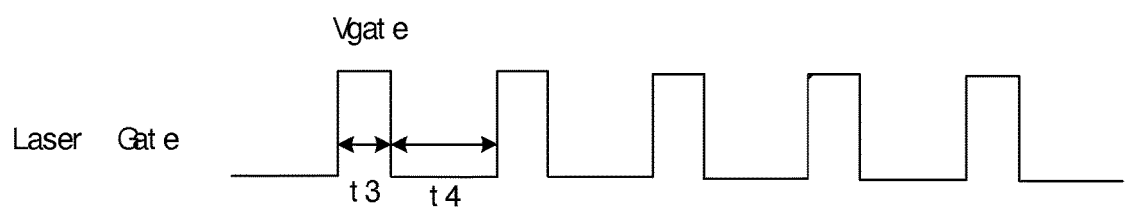
FIG. 5 is a time sequence diagram of an electric potential of a scanning line provided by an embodiment of the present disclosure.

Wherein, as illustrated in FIG. 5, a voltage of the second crossed overlapping coupling area S2 changes between 0 and Vgate. Vgate is a second voltage and ranges from −20V to 20 V, and a frequency thereof is f1=1/(t3+t4).

In an embodiment, the number of the signal emitting lines 30 and the number of the scanning lines 10 are same, and the signal emitting lines 30, the signal receiving lines 40, and the readout lines are distributed in a cross arrangement. A time-sharing-by-row manner can be used. By performing the time sharing manner of scanning alternately on the signal emitting lines 30 and the scanning lines 10, the touch circuit and the light sensitive circuit can work alternately according to the time-sharing-by-row manner, effectively solving a crosstalk problem between the touch circuit and the light sensitive circuit.

Wherein, a reason of generation of the crosstalk between the touch circuit and the light sensitive circuit is that the readout line of the light sensitive circuit and the signal emitting line 30 of the touch circuit form the first crossed overlapping coupling area S1, and the signal receiving line 40 and the scanning line 10 form the second crossed overlapping coupling area S2, and the first crossed overlapping coupling area S1 and the second crossed overlapping coupling area S2 cause signal crosstalk between the touch circuit and the light sensitive circuit.

Figure 6:
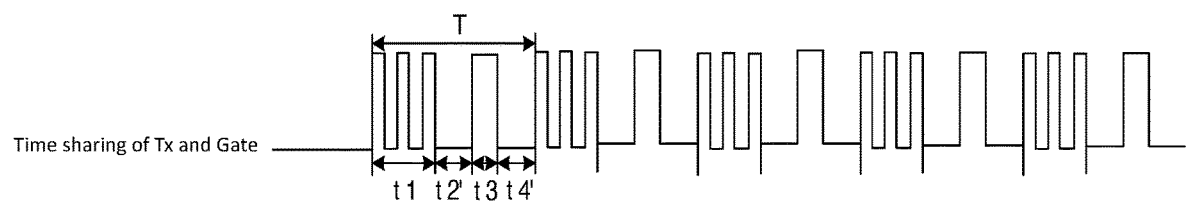
FIG. 6 is a time sequence diagram of electric potentials of time sharing by row of the signal emitting lines and the scanning lines provided by an embodiment of the present disclosure.

In an embodiment, as illustrated in FIG. 6, which is a time sequence diagram of using the time-sharing-by-row manner on the signal emitting lines 30 and the scanning lines 10 for scanning. After using time sharing, a frequency is f=1/(t1+t2'+t3+t4'). A scanning time of the signal emitting line 30 is the first time period, and a scanning time of the scanning lines 10 is the third time period.

Wherein, a time period T of one cycle is t1+t2'+t3+t4'.

Wherein, an interval time between therein is (t2'+t4').

Wherein, the second time period needs to be greater than or equal to a data collecting time of the signal receiving line 30 crossed to the signal emitting line 40.

Wherein, the fourth time period needs to be greater than the time of the data collecting time of the light sensitive circuit.

Wherein t1 is the first time period, t2' is the second time period, t3 is the third time period, and t4' is the fourth time period.

The touch panel provided by the embodiments of the present disclosure includes the plurality of light sensitive areas arranged in the array manner. The touch panel includes the plurality of scanning lines, the plurality of data lines disposed along the second direction, the light sensitive circuits, and the touch circuit. The light sensitive circuits are disposed in the light sensitive areas. The light sensitive transistor includes the substrate, the gate electrode, the gate insulation layer, the active layer, the source/drain electrode layer, and the light sensitive transistor is configured to convert an optical signal to an electrical signal. The touch circuit includes the plurality of signal emitting electrodes disposed along the first direction, and the plurality of signal receiving electrodes disposed along the second direction. Wherein, the light sensitive circuit includes the readout line disposed along the second direction, the signal emitting line, the scanning lines, and the gate electrode are disposed on the same layer, and the signal receiving line, the readout line, and the source/drain electrode layer are disposed on the same layer. By disposing the signal emitting lines, the scanning line, and the gate electrode on the same layer, and by disposing the signal receiving line, the data line, and the readout line on the same layer, the touch circuit and the light sensitive circuit can be integrated in a same touch panel on the precondition of not adding additional film layers.

Detailed description of the touch panel and the display device provided by embodiments of the present disclosure is described above. The principle and implementation manner of present disclosure are described herein with reference to specific embodiments. The foregoing descriptions of the embodiments are merely used for better understanding the technical solutions and core ideas of the present disclosure. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present disclosure.

What is claimed is:

1. A touch panel, comprising a plurality of light sensitive areas arranged in an array manner, wherein the touch panel comprises:
    a plurality of scanning lines disposed along a first direction;
    a plurality of data lines disposed along a second direction;
    a plurality of light sensitive circuits disposed in the light sensitive areas, wherein the light sensitive circuit comprises a light sensitive transistor, the light sensitive transistor comprises a substrate, a gate electrode, a gate insulation layer, an active layer, and a source/drain electrode layer, and the light sensitive transistor is configured to convert an optical signal to an electrical signal; and
    a touch circuit comprising a plurality of signal emitting electrodes disposed along the first direction, and a plurality of signal receiving electrodes disposed along the second direction;
    wherein the plurality of signal emitting electrodes form a plurality of signal emitting lines, and the plurality of signal receiving electrodes form a plurality of signal receiving lines; and
    wherein the light sensitive circuit comprises a readout line disposed along the second direction, the signal emitting line, the scanning lines, and the gate electrode are disposed on a same layer, and the signal receiving line, the readout line, and the source/drain electrode layer are disposed on a same layer.

2. The touch panel as claimed in claim 1, wherein the light sensitive circuit comprises a switch transistor, a gate electrode of the light sensitive transistor is connected to a low-electric-potential power-supply electrode, a first electrode of the light sensitive transistor is connected to a high-electric-potential power-supply electrode, a second electrode of the light sensitive transistor is connected to a first electrode of the switch transistor, a gate electrode of the switch transistor is connected to the scanning line, and a second electrode of the switch transistor is connected to a readout line.

3. The touch panel as claimed in claim 2, wherein the light sensitive circuit comprises a storage capacitor, the storage capacitor comprises a first terminal and a second terminal, the first terminal is connected to the second electrode of the light sensitive transistor and the first electrode of the switch transistor, and the second terminal is connected to the low-electric-potential power-supply electrode.

4. The touch panel as claimed in claim 3, wherein the light sensitive circuit comprises a first position detecting circuit, and the first position detecting circuit is connected to the readout line.

5. The touch panel as claimed in claim 3, wherein the light sensitive circuit comprises a second position detecting circuit, and the second position detecting circuit is connected to the signal receiving line.

6. The touch panel as claimed in claim 5, wherein when the touch panel is stimulated by a finger's touch, the storage capacitor between the signal emitting line and the signal receiving line changes, charges of the storage capacitor have been substantially changed, and change in the storage capacitor is transmitted by a signal, wherein when the signal passes through the second position detecting circuit, a touch position can be detected.

7. The touch panel as claimed in claim 1, wherein a first overlapping area is formed by projections of the readout line and the signal emitting line on the substrate, and a second overlapping area is formed by projections of the scanning line and the signal receiving line on the substrate.

8. The touch panel as claimed in claim 7, wherein a number of the scanning lines and a number of the signal emitting lines are same.

9. The touch panel as claimed in claim 7, wherein the scanning lines and the signal emitting lines are arranged at intervals.

10. The touch panel as claimed in claim 7, wherein a number of the scanning lines and a number of the signal emitting lines are different.

11. The touch panel as claimed in claim 7, wherein a set of the scanning lines and a set of the signal emitting lines are arranged at intervals.

12. The touch panel as claimed in claim 11, wherein the set of the scanning lines comprises at least two of the scanning lines, and the set of the signal emitting lines comprises at least two of the signal emitting lines.

13. The touch panel as claimed in claim 12, wherein a number of lines of the set of the scanning lines is different from a number of lines of the set of the signal emitting lines.

14. The touch panel as claimed in claim 12, wherein a number of lines of the set of the scanning lines is same as a number of lines of the set of the signal emitting lines.

15. The touch panel as claimed in claim 9, wherein there is a first time period, a second time period, a third time period, and a fourth time period, the signal emitting line transmits a first signal in the first time period, the scanning line transmits a second signal in the third time period, the second time period is between the first time period and the third time period, and the fourth time period is between the third time period and a next first time period.

16. The touch panel as claimed in claim 15, wherein the signal emitting lines and the scanning lines are configured to receive a periodic voltage.

17. The touch panel as claimed in claim 15, wherein the second time period is greater than or equal to a data collecting time of the signal receiving line crossed to the signal emitting line.

18. The touch panel as claimed in claim 15, wherein the second time period is greater than the first time period.

19. The touch panel as claimed in claim 15, wherein the fourth time period is greater than the third time period.

20. A display device, comprising the touch panel as claimed in claim 1.

* * * * *